[19] United States Patent
Johansson et al.

[11] Patent Number: 5,519,747
[45] Date of Patent: May 21, 1996

[54] APPARATUS AND METHODS FOR FABRICATING SPACERS FOR A NUCLEAR FUEL ROD BUNDLE

[75] Inventors: Eric B. Johansson, Wrightsville Beach; David G. Smith, Leland, both of N.C.

[73] Assignee: General Electric Company, Schenectady, N.Y.

[21] Appl. No.: 317,731

[22] Filed: Oct. 4, 1994

[51] Int. Cl.[6] .................................................. G21C 3/34
[52] U.S. Cl. ........................ 376/442; 376/438; 376/446; 376/462; 376/448
[58] Field of Search ................................. 376/442, 438, 376/446, 462, 448; 976/DIG. 81; 29/723

[56] References Cited

U.S. PATENT DOCUMENTS

| | | | |
|---|---|---|---|
| 3,344,855 | 10/1967 | Clark | 165/159 |
| 3,350,276 | 10/1067 | Warberg et al. | 176/78 |
| 3,457,140 | 7/1969 | Glandin | 176/78 |
| 3,746,619 | 7/1973 | Iwao | 376/442 |
| 3,749,640 | 7/1973 | Israel | 176/78 |
| 3,809,609 | 5/1974 | Krawiec et al. | 176/78 |
| 3,886,038 | 5/1975 | Raven | 176/78 |
| 3,944,779 | 3/1976 | Umino et al. | 219/121 EM |
| 4,005,521 | 2/1977 | Kaplan et al. | 29/469 |
| 4,007,843 | 3/1977 | Patterson et al. | 376/442 |
| 4,039,379 | 8/1977 | Patterson et al. | 376/439 |
| 4,061,536 | 12/1977 | Creagan et al. | 376/439 |
| 4,069,102 | 1/1978 | Berringer et al. | 376/463 |
| 4,086,809 | 5/1978 | Wu et al. | 73/161 |
| 4,089,742 | 5/1978 | Amaral et al. | 376/440 |
| 4,108,719 | 8/1978 | Olshausen | 376/245 |
| 4,119,489 | 10/1978 | Itoh et al. | 376/444 |
| 4,124,444 | 11/1978 | Jabsen | 376/444 |
| 4,125,435 | 11/1978 | Jabsen | 376/442 |
| 4,137,125 | 1/1979 | Walters | 376/442 |
| 4,142,934 | 3/1979 | Wild | 376/434 |

(List continued on next page.)

FOREIGN PATENT DOCUMENTS

| | | |
|---|---|---|
| 0503553 | 9/1962 | European Pat. Off. . |
| 0192092 | 1/1989 | European Pat. Off. . |
| 0307705 | 3/1989 | European Pat. Off. . |
| 0210526 | 5/1989 | European Pat. Off. . |
| 0237064 | 3/1991 | European Pat. Off. . |
| 0428092 | 5/1991 | European Pat. Off. . |
| 0428093 | 5/1991 | European Pat. Off. . |
| 0273183 | 8/1991 | European Pat. Off. . |
| 0489334 | 6/1992 | European Pat. Off. . |
| 0330013 | 11/1992 | European Pat. Off. . |
| 0514115 | 11/1992 | European Pat. Off. . |
| 0514116 | 11/1992 | European Pat. Off. . |
| 0514117 | 11/1992 | European Pat. Off. . |
| 0514120 | 11/1992 | European Pat. Off. . |
| 0518306 | 12/1992 | European Pat. Off. . |
| 0539867 | 5/1993 | European Pat. Off. . |
| 1-138493 | 5/1989 | Japan . |
| 2-163695 | 6/1990 | Japan . |
| 454824 | 5/1988 | Sweden . |
| 454823 | 5/1988 | Sweden . |
| 1153444 | 5/1969 | United Kingdom . |

*Primary Examiner*—Donald P. Walsh
*Assistant Examiner*—Meena Chelliah
*Attorney, Agent, or Firm*—Nixon & Vanderhye

[57] ABSTRACT

A fixturing tool includes a sleeve having a central region with a circular axial opening and four leaf springs projecting from each of the opposite ends of the central region. The central region is cruciform in cross-section with arcuate side walls between the projections of the cruciform. Unit cells are arranged on a base having openings corresponding in location to the centers of the unit cells in their final assembly in a spacer for a nuclear fuel rod bundle. Fixturing devices are freely and loosely disposed within the unit cells and pins are partially inserted through the fixturing devices to expand the leaf springs to engage the unit cells. Once the cells with fixturing devices and partially inserted pins are centered over the base openings, the pins are advanced into the openings in the base to accurately align each unit cell relative to one another to enable final welding of adjacent cells to one another.

20 Claims, 5 Drawing Sheets

U.S. PATENT DOCUMENTS

| | | | |
|---|---|---|---|
| 4,172,761 | 10/1979 | Raven et al. | 376/462 |
| 4,175,003 | 11/1979 | Beuchel et al. | 376/442 |
| 4,190,494 | 2/1980 | Olsson | 376/462 |
| 4,194,948 | 3/1980 | Ledin | 376/364 |
| 4,224,107 | 9/1980 | Delafosse et al. | 376/462 |
| 4,239,597 | 12/1980 | Christiansen | 376/441 |
| 4,246,783 | 1/1981 | Steven et al. | 73/161 |
| 4,268,356 | 5/1981 | Kmonk et al. | 376/462 |
| 4,312,705 | 1/1982 | Steinke | 376/441 |
| 4,313,797 | 2/1982 | Attix | 376/441 |
| 4,325,786 | 4/1982 | Wohlsen | 376/442 |
| 4,357,298 | 11/1982 | Wolters, Jr. et al. | 376/441 |
| 4,391,771 | 7/1983 | Anthony | 376/451 |
| 4,396,573 | 8/1983 | Feutrel | 376/442 |
| 4,416,852 | 11/1983 | Nylund | 376/438 |
| 4,418,036 | 11/1983 | Gjertsen et al. | 376/438 |
| 4,420,458 | 12/1983 | Dunlap et al. | 376/447 |
| 4,435,357 | 3/1984 | Krieger | 376/272 |
| 4,454,093 | 6/1984 | Nylund et al. | 376/282 |
| 4,474,730 | 10/1984 | Hellman et al. | 376/462 |
| 4,478,786 | 10/1984 | Andersson et al. | 376/444 |
| 4,489,038 | 12/1984 | Nylund | 376/446 |
| 4,491,540 | 1/1985 | Larker et al. | 252/628 |
| 4,492,844 | 1/1985 | Kobuck et al. | 219/121 |
| 4,499,047 | 2/1985 | Borrman et al. | 376/434 |
| 4,508,679 | 4/1985 | Matzner et al. | 376/438 |
| 4,512,820 | 4/1985 | Mori et al. | 148/17.7 N |
| 4,521,374 | 6/1985 | Duncan | 376/462 |
| 4,522,330 | 6/1985 | Kerrey et al. | 228/182 |
| 4,526,744 | 7/1985 | Borrman et al. | 376/440 |
| 4,526,745 | 7/1985 | Nylund et al. | 376/444 |
| 4,526,746 | 7/1985 | Fredin | 376/444 |
| 4,540,545 | 9/1985 | Kondo | 376/364 |
| 4,544,522 | 10/1985 | Curulla et al. | 376/441 |
| 4,556,531 | 12/1985 | Curulla | 376/441 |
| 4,557,892 | 12/1985 | Komoda | 376/412 |
| 4,568,512 | 2/1986 | Jolly | 376/442 |
| 4,571,324 | 2/1986 | Johansson et al. | 376/441 |
| 4,578,240 | 3/1986 | Cadwell | 376/441 |
| 4,579,711 | 4/1986 | Mishima et al. | 376/442 |
| 4,585,614 | 4/1986 | Helmersson | 367/434 |
| 4,585,616 | 4/1986 | DeMario et al. | 376/442 |
| 4,587,093 | 5/1986 | Borrman et al. | 376/444 |
| 4,587,704 | 5/1986 | Matzner et al. | 29/446 |
| 4,588,550 | 5/1986 | Blomstrand et al. | 376/438 |
| 4,597,937 | 7/1986 | Sakurai et al. | 376/441 |
| 4,617,170 | 10/1986 | Suchy | 376/438 |
| 4,632,804 | 12/1986 | Wallander et al. | 376/441 |
| 4,645,643 | 2/1987 | Leclercq | 376/447 |
| 4,646,021 | 2/1987 | Brown | 324/303 |
| 4,649,021 | 3/1987 | Taleyarkhan | 376/444 |
| 4,652,426 | 3/1987 | Boyle et al. | 376/352 |
| 4,654,193 | 3/1987 | Amano et al. | 376/436 |
| 4,655,995 | 4/1987 | Freeman et al. | 376/267 |
| 4,656,000 | 4/1987 | Sakurai et al. | 376/352 |
| 4,659,541 | 4/1987 | Rylatt | 376/442 |
| 4,659,542 | 4/1987 | Kerrey | 376/442 |
| 4,659,543 | 4/1987 | Lui | 376/444 |
| 4,661,220 | 4/1987 | Fejes et al. | 209/141.5 |
| 4,663,119 | 5/1987 | Kerrey | 376/446 |
| 4,664,882 | 5/1987 | Doshi | 376/423 |
| 4,665,866 | 5/1987 | Wepfer | 122/510 |
| 4,666,657 | 5/1987 | Altman | 376/234 |
| 4,666,663 | 5/1987 | Steinke | 376/441 |
| 4,666,664 | 5/1987 | Doshi | 376/261 |
| 4,671,926 | 6/1987 | Broberg et al. | 376/364 |
| 4,675,154 | 6/1987 | Nelson et al. | 376/444 |
| 4,683,115 | 7/1987 | Frömel | 376/439 |
| 4,686,079 | 8/1987 | Ishikawa et al. | 376/444 |
| 4,689,091 | 8/1987 | Yoshida et al. | 148/11.5 F |
| 4,692,302 | 9/1987 | DeMario et al. | 376/439 |
| 4,692,303 | 9/1987 | Osborne | 376/446 |
| 4,695,426 | 9/1987 | Nylund | 376/441 |
| 4,698,204 | 10/1987 | Taleyarkhan | 376/439 |
| 4,702,881 | 10/1987 | Weiland et al. | 376/442 |
| 4,705,663 | 11/1987 | Steven et al. | 376/442 |
| 4,707,328 | 11/1987 | Arbink et al. | 376/446 |
| 4,708,845 | 11/1987 | Mildrum et al. | 376/435 |
| 4,711,436 | 12/1987 | Kobuck et al. | 269/40 |
| 4,714,585 | 12/1987 | Kast | 376/442 |
| 4,716,011 | 12/1987 | Taleyarkhan | 376/281 |
| 4,716,016 | 12/1987 | DeMario et al. | 376/446 |
| 4,716,017 | 12/1987 | Kerrey | 376/446 |
| 4,725,403 | 2/1988 | Buettiker | 376/439 |
| 4,726,926 | 2/1988 | Patterson et al. | 376/439 |
| 4,728,490 | 3/1988 | Taleyarkhan | 376/439 |
| 4,729,867 | 3/1988 | DeMario | 376/261 |
| 4,735,766 | 4/1988 | Scharpenberg | 376/245 |
| 4,735,769 | 4/1988 | Lettau | 376/441 |
| 4,738,819 | 4/1988 | Taleyarkhan | 376/444 |
| 4,738,821 | 4/1988 | Shallenberger et al. | 376/444 |
| 4,740,350 | 4/1988 | Taleyarkhan | 376/441 |
| 4,740,351 | 4/1988 | Katsumizu et al. | 376/446 |
| 4,744,942 | 5/1988 | Ferrari et al. | 376/442 |
| 4,749,547 | 6/1988 | Blomstrand et al. | 376/444 |
| 4,753,774 | 6/1988 | Taleyarkhan et al. | 376/444 |
| 4,756,878 | 7/1988 | King et al. | 376/439 |
| 4,758,403 | 7/1988 | Noailly | 376/439 |
| 4,759,912 | 7/1988 | Taleyarkhan | 376/435 |
| 4,770,843 | 9/1988 | Taleyarkhan | 376/216 |
| 4,775,509 | 10/1988 | Noailly et al. | 376/442 |
| 4,780,273 | 10/1988 | Dressel | 376/441 |
| 4,784,825 | 11/1988 | Busselman et al. | 376/399 |
| 4,793,963 | 12/1988 | DeMario et al. | 376/267 |
| 4,795,608 | 1/1989 | Nylund | 376/444 |
| 4,803,043 | 2/1989 | DeMario et al. | 376/442 |
| 4,804,516 | 2/1989 | Thomazet et al. | 376/439 |
| 4,818,471 | 4/1989 | Thomson et al. | 376/254 |
| 4,818,473 | 4/1989 | Lui | 376/261 |
| 4,818,478 | 4/1989 | Taleyarkhan | 376/435 |
| 4,828,782 | 5/1989 | Donnelly | 376/252 |
| 4,839,136 | 6/1989 | DeMario et al. | 376/462 |
| 4,844,860 | 7/1989 | Hatfield | 376/439 |
| 4,849,161 | 7/1989 | Brown et al. | 376/439 |
| 4,859,407 | 8/1989 | Nylund | 376/446 |
| 4,869,865 | 9/1989 | White et al. | 376/260 |
| 4,879,090 | 11/1989 | Perrotti et al. | 376/462 |
| 4,885,127 | 12/1989 | Yokoyama | 376/462 |
| 4,895,698 | 1/1990 | DeMario | 376/442 |
| 4,913,707 | 4/1990 | Moreno et al. | 29/792 |
| 4,913,875 | 4/1990 | Johansson et al. | 376/439 |
| 4,924,586 | 5/1990 | King, Jr. et al. | 29/723 |
| 4,931,615 | 6/1990 | Muncy et al. | 219/121.67 |
| 4,946,587 | 8/1990 | Reeves et al. | 209/539 |
| 4,957,697 | 9/1990 | Wada | 376/442 |
| 4,970,048 | 11/1990 | Noailly | 376/439 |
| 4,980,121 | 12/1990 | Roberts et al. | 376/439 |
| 4,988,474 | 1/1991 | Hoffmann et al. | 376/261 |
| 4,994,234 | 2/1991 | Nylund | 376/443 |
| 4,999,153 | 3/1991 | Johansson et al. | 376/443 |
| 5,002,726 | 3/1991 | Johansson | 376/448 |
| 5,024,807 | 6/1991 | Hatfield et al. | 376/352 |
| 5,024,810 | 6/1991 | Bachman | 376/438 |
| 5,032,351 | 7/1991 | Johansson | 376/438 |
| 5,035,853 | 7/1991 | Lettau et al. | 376/441 |
| 5,069,864 | 12/1991 | Johansson | 376/441 |
| 5,078,961 | 1/1992 | Johansson et al. | 376/448 |
| 5,080,858 | 1/1992 | Nylund | 376/443 |
| 5,085,827 | 2/1992 | Johansson et al. | 376/444 |
| 5,089,220 | 2/1992 | Nylund | 376/439 |
| 5,089,221 | 2/1992 | Johansson et al. | 376/442 |
| 5,091,145 | 2/1992 | Petit | 376/441 |

| | | | |
|---|---|---|---|
| 5,094,805 | 3/1992 | Suchy et al. | 376/438 |
| 5,096,660 | 3/1992 | Hembjer | 376/438 |
| 5,110,539 | 5/1992 | Perrotti et al. | 376/439 |
| 5,128,097 | 7/1992 | Fukasawa et al. | 376/438 |
| 5,130,083 | 7/1992 | Johansson | 376/441 |
| 5,139,736 | 8/1992 | Bryan | 376/442 |
| 5,147,600 | 9/1992 | Kadono et al. | 376/462 |
| 5,149,495 | 9/1992 | Elkins | 376/444 |
| 5,173,252 | 12/1992 | Johansson | 376/448 |
| 5,174,949 | 12/1992 | Johansson | 376/439 |
| 5,178,825 | 1/1993 | Johansson | 376/438 |
| 5,180,548 | 1/1993 | Verdier | 376/439 |
| 5,180,550 | 1/1993 | Nylund | 376/439 |
| 5,183,629 | 2/1993 | Canat et al. | 376/439 |
| 5,186,891 | 2/1993 | Johansson et al. | 376/438 |
| 5,200,143 | 4/1993 | Johansson | 376/449 |
| 5,209,899 | 5/1993 | Johansson et al. | 376/442 |
| 5,211,908 | 5/1993 | Verdier | 376/442 |
| 5,226,633 | 7/1993 | Willard, Jr. | 267/159 |
| 5,229,068 | 7/1993 | Johansson et al. | 376/371 |
| 5,243,634 | 9/1993 | Bryan | 376/439 |
| 5,245,644 | 9/1993 | Büttner et al. | 376/442 |
| 5,253,278 | 10/1993 | Kanazawa et al. | 376/434 |
| 5,263,071 | 11/1993 | Farkas et al. | 376/438 |
| 5,272,743 | 12/1993 | Yamazaki et al. | 376/463 |
| 5,313,506 | 5/1994 | Matzner | 376/441 |
| 5,317,613 | 5/1994 | Fennern | 376/439 |
| 5,327,470 | 7/1994 | Johansson | 376/438 |
| 5,343,504 | 8/1994 | Gaylord, Jr. et al. | 376/247 |
| 5,345,487 | 9/1994 | Johansson | 376/444 |
| 5,361,288 | 11/1994 | Johansson | 376/441 |
| 5,371,768 | 12/1994 | Matzner | 376/441 |
| 5,375,154 | 12/1994 | Matzner et al. | 228/10 |
| 5,375,756 | 12/1994 | Haughton et al. | 228/10 |
| 5,377,236 | 12/1994 | Smith et al. | 376/245 |

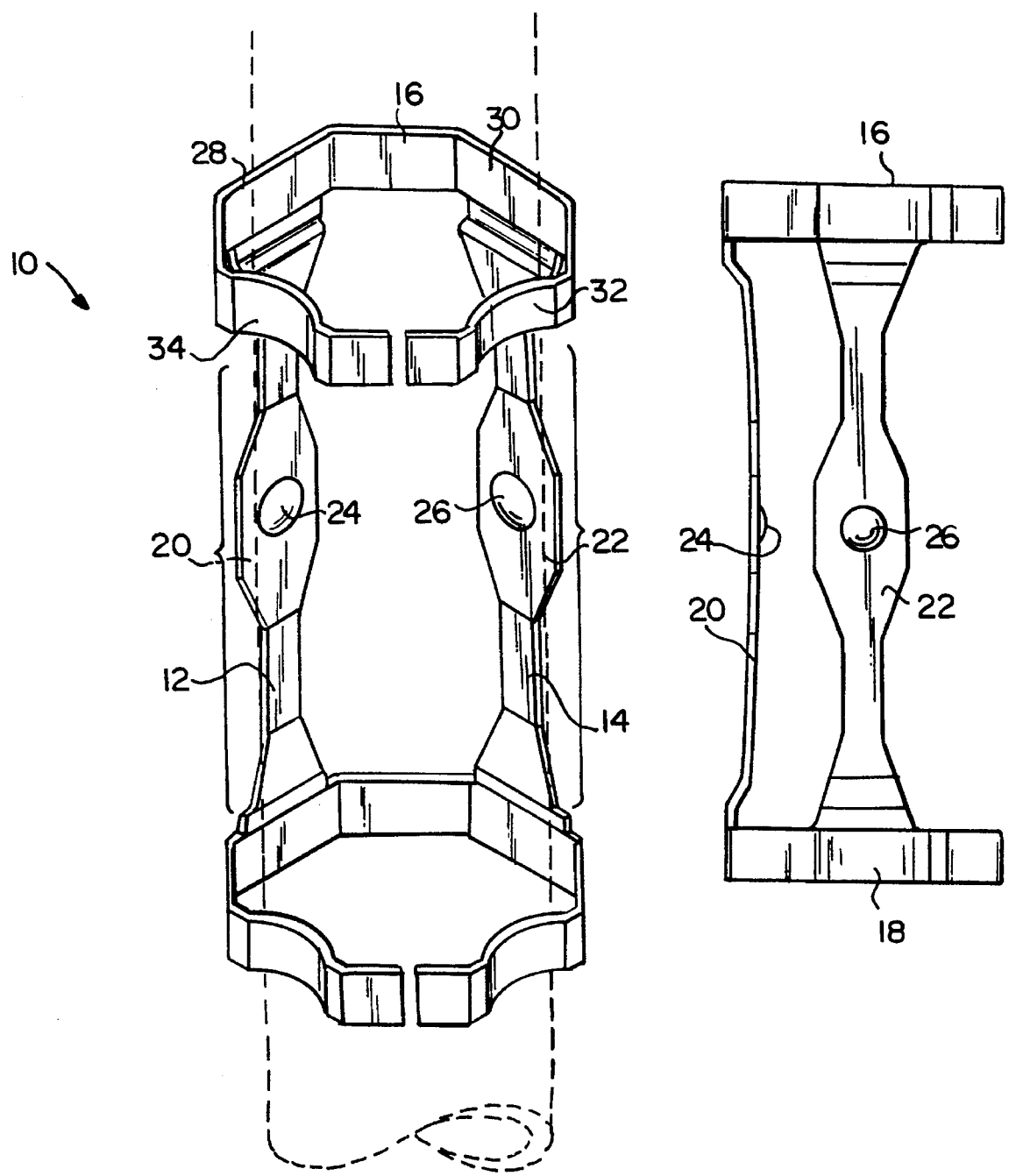

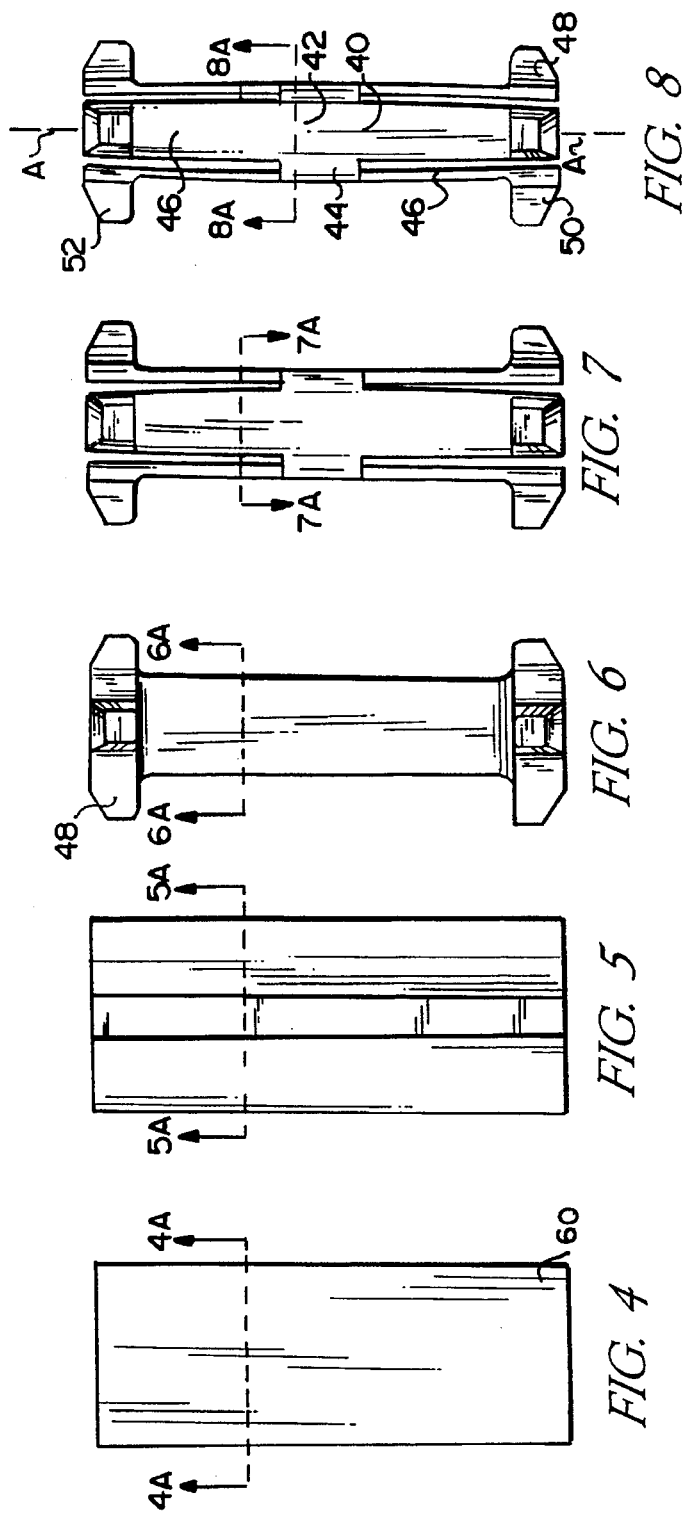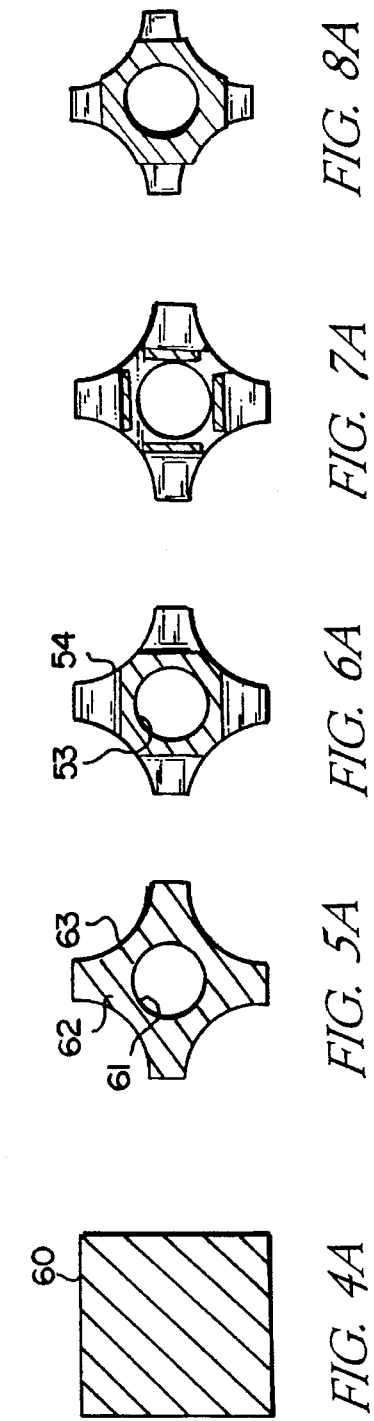

FIG. 9
FIG. 10
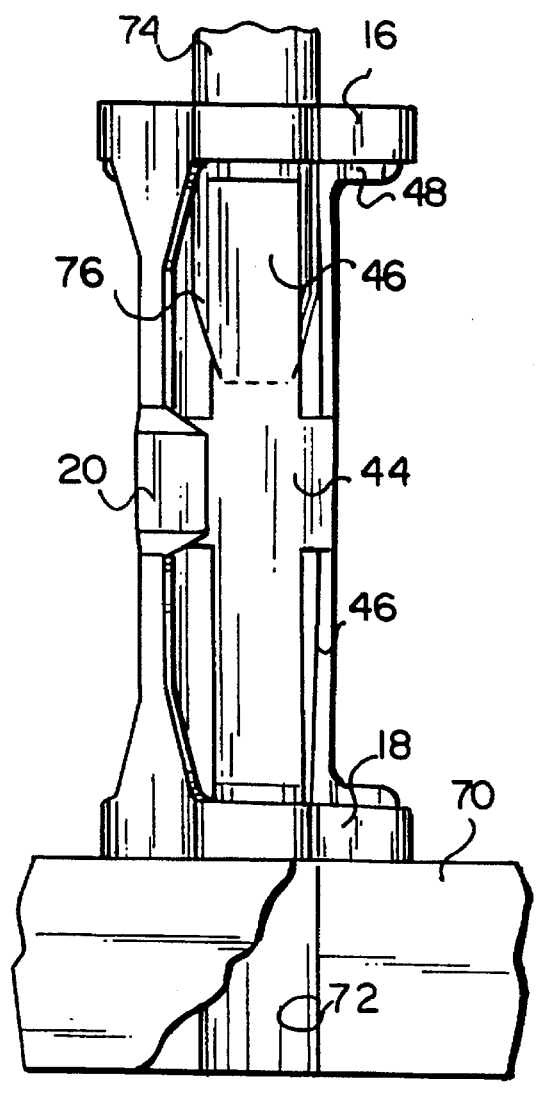
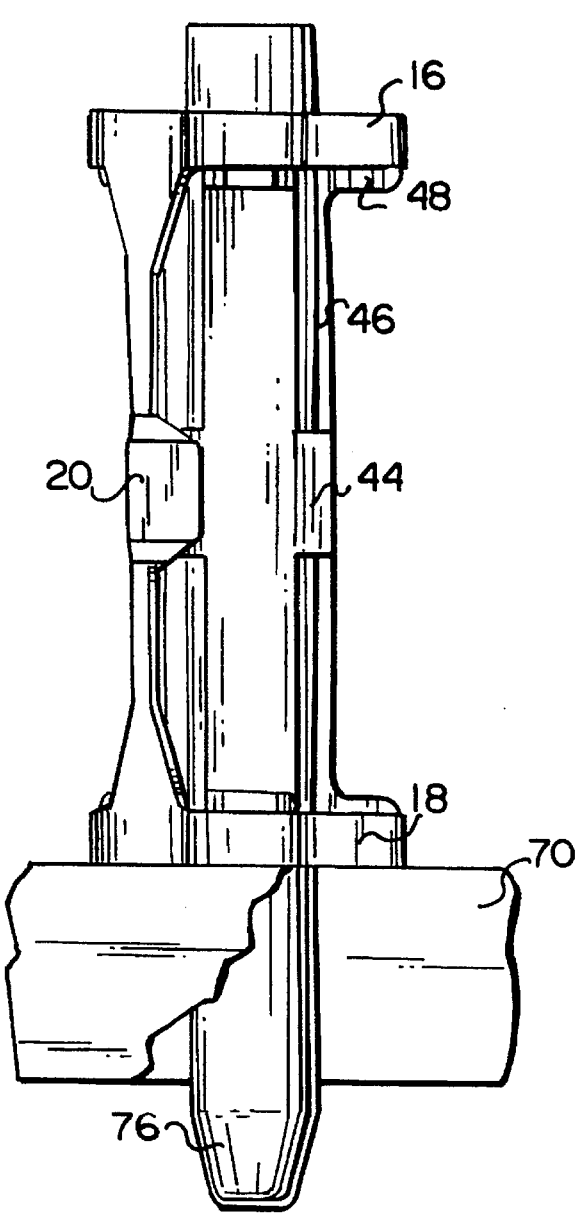

APPARATUS AND METHODS FOR FABRICATING SPACERS FOR A NUCLEAR FUEL ROD BUNDLE

TECHNICAL FIELD

The present invention relates to apparatus and methods for fabricating spacers for nuclear fuel rod bundles and particularly to apparatus and methods for aligning and securing the unit cells of a spacer to one another.

BACKGROUND

Spacers are utilized in nuclear fuel bundles to maintain the required spacing between vertically upstanding, laterally spaced, side-by-side nuclear fuel rods within the bundles. As well known, a nuclear fuel bundle contains an array of a predetermined number of fuel rods, for example, 8×8, 9×9 or 10×10 arrays of fuel rods. The fuel rods are supported on a lower tie plate and extend upwardly to an upper tie plate and, in a BWR, within a fuel bundle channel. The primary function of the spacers is to align the fuel rods in correct side-by-side relation to one another throughout their vertical length.

Spacers are commonly constructed having two constituent parts. The first part includes an interior grid formed of an array of discrete unit cells. Each unit cell surrounds a fuel rod and the cells are typically welded to one another to form a grid. The second constituent part comprises a band about the spacer which locates the spacer within the fuel bundle channel in a BWR. A typical unit cell includes two spring legs spaced from one another and connected at the top by a fuel rod encircling arm and at the bottom by another fuel rod encircling arm. Each spring leg is deflected inwardly and defines at a central portion thereof a respective rod contacting portion. The pair of spring legs are orthogonally related and bias the rod against stops formed opposite the spring legs in the upper and lower encircling arms. The upper and lower encircling arms are generally of an octagonal configuration, although the stops are provided by arcuately inwardly directed portions of those arms opposite the spring legs.

To fabricate a complete spacer, the unit cells and bands are typically placed in a fixture, which holds them in the correct positions for welding. The welds are formed where the adjacent cells abut, i.e., at each of the four linearly orthogonally related sides of each of the upper and lower encircling bands. This fabrication procedure, however, is slow, labor-intensive and not adaptable to automation. The basic problem is that the individual unit cells are readily and easily damaged. For example, the upper and lower encircling arms are, in effect, cantilevered horizontally from the vertically extending springs. These encircling arms can thus be bent easily during assembly. A typical assembly procedure employs a jig comprised of a base plate with pins projecting upwardly from the plate. To align the unit cells before welding, the unit cells are disposed on the pins by sliding the unit cells axially onto the pins. The upper and lower arms of the unit cell are thus subject to bending during this insertion process. They also can hang up on adjacent cells.

DISCLOSURE OF THE INVENTION

In accordance with the present invention, there is provided an apparatus and a method of fabrication which minimizes or eliminates the foregoing and other problems associated with the assembly of unit cells for nuclear fuel rod spacers and provides a novel and improved apparatus and method for assembling unit cells to form a spacer for a nuclear fuel rod bundle. Particularly, specialized fixturing devices are provided which, in conjunction with other pins and a base having an array of holes, are used to align the unit cells relative to one another to facilitate welding of the cells together. Each fixturing device includes an elongated sleeve having an axis, a central region about the axis, and a plurality of leaf springs projecting in opposite directions from the central region, the device preferably being formed integrally of metal or plastic. The central region of the sleeve preferably has a circular opening coincident with the axis of the sleeve and a generally cruciform shape in a plane normal to the axis of the sleeve. Leaf springs project from each of the opposite ends of the central region and are spaced laterally from one another and symmetrically about the axis of the sleeve. The springs terminate at distal ends in laterally outwardly extending projections. In a preferred embodiment, four leaf springs project in a generally axial direction from each of the opposite ends of the central region, terminating in laterally outward projections. The springs are arranged symmetrically about the axis of the sleeve and are preferably bent slightly inwardly toward the axis. Where the fixturing devices are formed of metal, they are heat-treated to maintain the springs bent inwardly in an unstressed condition. By providing springs bent inwardly, a clearance between the projections and the insides of the unit cells is provided when the sleeves are inserted into the cells during the assembly procedure, which will now be described.

To align and ultimately assemble the unit cells to form a spacer, the individual unit cells are arranged on a base having a plurality of openings generally coincident with the axes of the unit cells in final assembly to form the spacer. The sleeves are then disposed inside the unit cells. The lateral dimensions of the sleeves are slightly smaller than the inside dimensions of the unit cells such that the sleeves are readily inserted into and slide freely relative to the cells. It will be appreciated that by inserting the sleeves into the unit cells, the lateral recesses formed by the generally cruciform central region of the sleeves accommodate the inwardly projecting central portions of the side springs of the unit cells, enabling the sleeves to properly align in a rotational sense about the common axes of the sleeves and unit cells. After disposition of the sleeves in the unit cells, pins are inserted part-way into each sleeve. By partially inserting the pins, the upper leaf springs are biased outwardly to engage the projections on their distal ends with the linear extending sides of the upper arms of the unit cell. The unit cells, with partially inserted sleeves, are then moved horizontally close together so that they are approximately centered over the holes in the base. This can be accomplished with a set of four bars which form a square slightly larger than the outer dimension of the spacer in final assembly. Once aligned, the pins are advanced completely through the sleeves into the holes in the base board. As a consequence, it will be appreciated that the pins and sleeves align the unit cells relative to one another in proper position for welding. Additionally, the pins are readily withdrawn from the sleeves, enabling the springs to return to their unstressed condition which, in turn, enables the sleeves to be readily withdrawn from the unit cells, after fabrication of the spacer is complete.

In a preferred embodiment according to the present invention, there is provided a fixturing device for aligning unit cells relative to one another to form a nuclear fuel rod bundle spacer comprising an elongated one-piece sleeve having an elongated axis, a central region about the axis and a plurality of leaf springs projecting in opposite directions from the central region and spaced laterally from one another about the axis, each said leaf spring having a distal end including a laterally outwardly extending projection for engagement with the unit cell, the central region having an outer surface generally cruciform in shape.

In a further preferred embodiment according to the present invention, there is provided a method of aligning unit cells for securement to one another to form a nuclear fuel rod bundle spacer comprising the steps of providing a base having an array of holes on centers corresponding in location to the centers of the unit cells in their final assembly in the spacer, disposing a fixturing device comprised of a sleeve having an axis and a plurality of springs about the axis in each unit cell, inserting a pin through each fixturing device in a generally axial direction to displace the springs into engagement with the unit cell and engaging the pin in a hole in the base to align the unit cells relative to one another.

Accordingly, it is a primary object of the present invention to provide a novel and improved apparatus and method for fabricating a spacer for a nuclear fuel rod bundle.

BRIEF DESCRIPTION OF THE DRAWINGS

FIG. 1 is a perspective view of a unit cell forming part of a nuclear fuel bundle spacer in which the fixture of the present invention is used in the fabrication of the spacer;

FIG. 2 is a side elevational view of the unit cell of FIG. 1;

FIGS. 4–8 illustrate various steps in the formation of a fixturing device used to align the unit cells in the fabrication of the spacer;

FIGS. 4A–8A cross-sectional plan views of the various devices illustrated in FIGS. 4–8, respectively, taken generally about on the lines 4A—4A, 5A—5A, 6A—6A, 7A—7A and 8A—8A;

FIGS. 9 and 10 are fragmentary side elevational views of a fixturing device according to the present invention illustrating its attachment to a base for alignment in a spacer configuration.

BEST MODE FOR CARRYING OUT THE INVENTION

Figure 3:
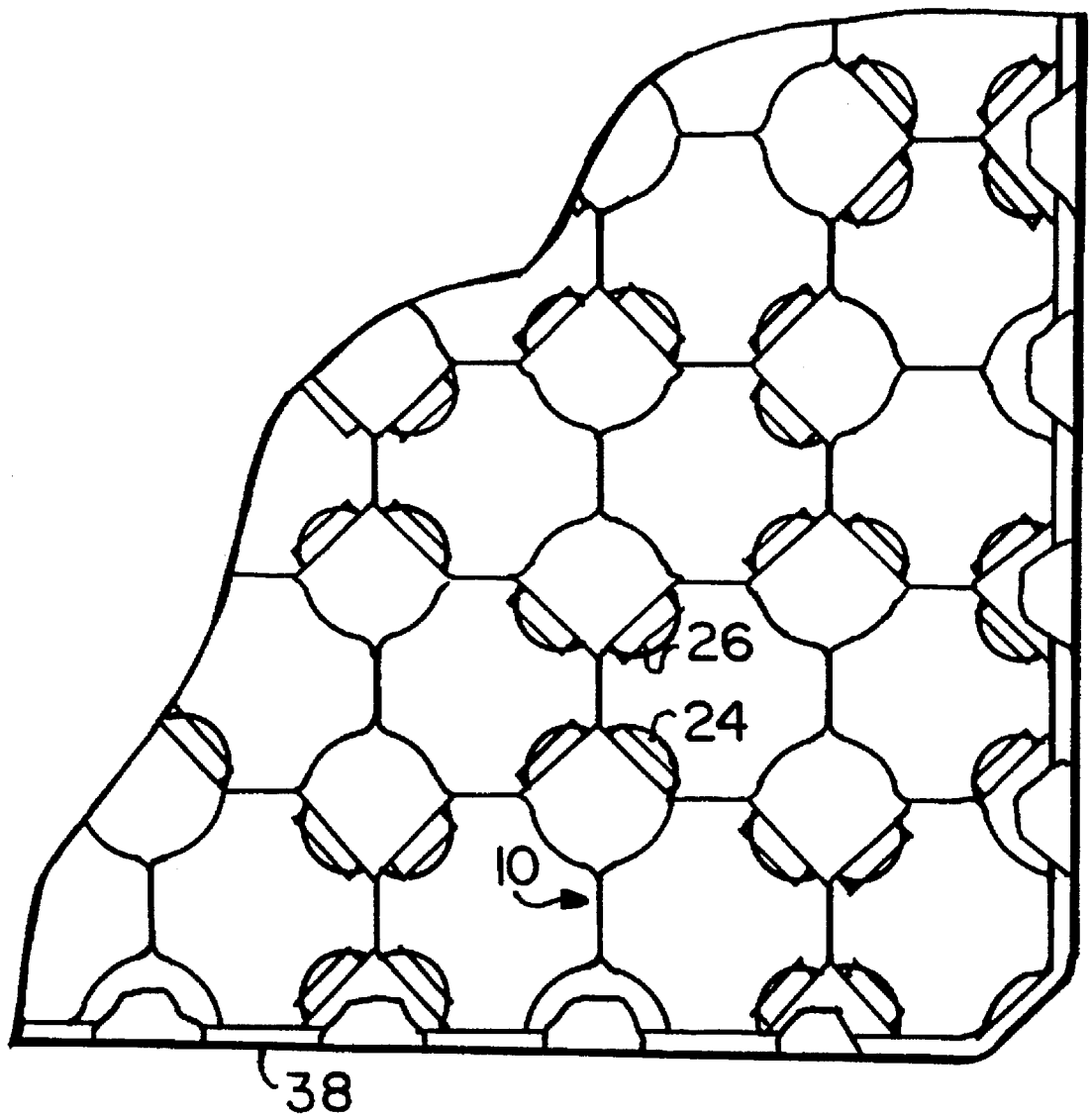
FIG. 3 is a fragmentary top plan view of a portion of a nuclear fuel rod spacer illustrating a plurality of the unit cells of FIGS. 1 and 2 in final assembly in the spacer.

Referring now to FIGS. 1 and 2, there is illustrated a unit cell for use in conjunction with other unit cells in the formation of a spacer for a nuclear fuel rod bundle. The unit cell, generally designated 10, includes a pair of spring legs 12 and 14 spaced one from the other and connected at the top by a fuel rod encircling arm 16 and, at the bottom, by a fuel rod encircling arm 18, a portion of a fuel rod being illustrated by the dashed lines in FIG. 1. Each of the respective spring legs 12 and 14 is deflected inwardly and includes a central portion 20 and 22, respectively, having inwardly projecting bulbous portions 24 and 26 for resiliently engaging the fuel rod. The upper and lower encircling arms 16 and 18 are identical in plan view and each comprises essentially a metal band in a horizontal octagonal configuration. The leaf springs 12 and 14 extend between a pair of right angularly related sides 28 and 30 of the arms, while the sides 32 and 34 opposite sides 28 and 30, respectively, are arcuately configured to form stops for the fuel rods.

As illustrated in FIG. 3, the unit cells are disposed adjacent one another and the linear extending sides thereof, excluding the sides connecting the leaf springs to the arms and the sides which have stops, are welded to adjacent unit cells to form the spacer, generally designated 36. A peripheral band 38 is disposed around the grid pattern formed by the welded unit cells to complete spacer 36.

Figure 11:
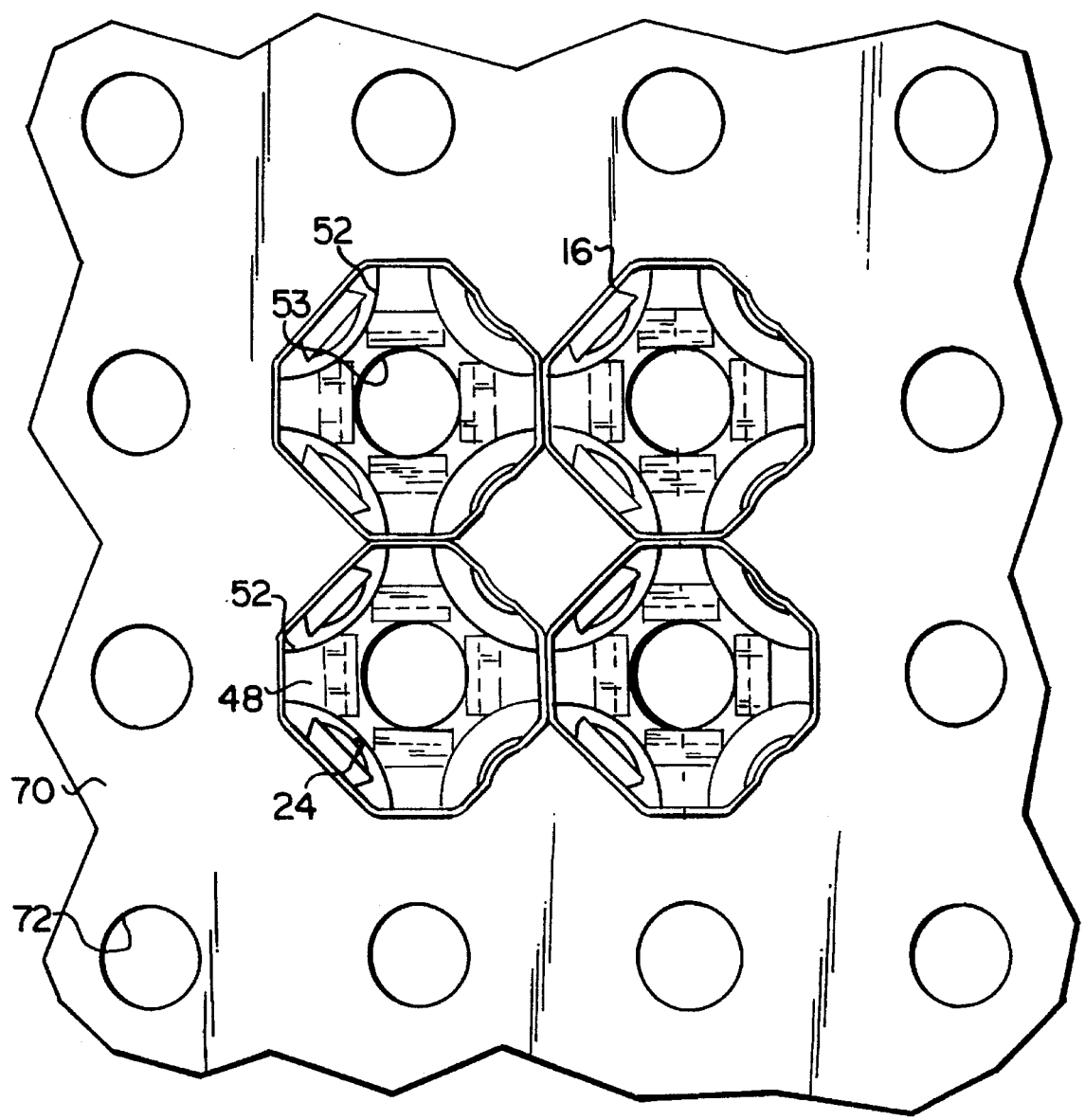
FIG. 11 is a fragmentary top plan view of fixturing devices and pins within the unit cells during the fabrication process, only four of the fixturing devices, pins and unit cells being illustrated.

As indicated previously, the prior procedure for aligning the unit cells in final configuration for welding to form the spacer is labor-intensive, very slow and not adaptable to automation. To facilitate the alignment of the unit cells with one another and, hence, final assembly of the unit cells to form the spacer 38, the present invention provides a fixturing device which, in conjunction with pins and a base, enables more rapid and efficient alignment of the unit cells for welding. Referring now to FIG. 8, there is illustrated a fixturing device, generally designated 40. The fixturing device 40 includes an elongated sleeve 42 having an axis A—A, a central region 44 and a plurality of leaf springs 46 projecting in opposite directions from the central region 44. The opposite ends of the sleeve 42 on opposite sides of central region 44 are symmetrical relative to one another and the description of the springs at one end will suffice as a description for the springs at the opposite end. The springs 42 constitute leaf springs, preferably integrally formed and projecting from the central region 44 and terminating at distal ends in laterally or radially outwardly extending projections 48 for engagement with the unit cell, as described hereafter. The axially outer faces of the projections 48 are chamfered at 50. Additionally, as seen in FIG. 11, the side walls 52 defining the projections 48 are tapered, for reasons discussed hereafter. In a preferred form, four leaf springs 46 project from each of the opposite ends of the central region 44. Springs 46 are bent inwardly toward the axis A—A and lie in that position in their unstressed conditions.

The central region 44 has a generally cruciform cross-section, i.e., essentially the cross-section illustrated in FIG. 8A, and a central circular opening 53. Preferably, the sides of the cruciform cross-section are arcuate, as at 54, to accommodate the inwardly directed springs 12 and 14 and projections 24 and 26 of the unit cells 10 when the fixturing device is inserted into and employed to align the unit cells to form the spacer.

The fixturing device 40 is preferably formed of an integral one-piece construction and may be formed of a metal or a plastic material. A preferred method of forming the fixturing device 40 starts, as illustrated in FIG. 4, with a bar 60 of solid material in a square cross-section having a length slightly greater than the height of the finished unit cell. As illustrated in FIG. 5A, a central circular hole 61 is drilled through the bar 60 along its axis and which hole 61 ultimately forms the central opening 53 in the central region 44. Additionally, corner material is removed to form a generally cruciform cross-section with four radial projections 62 and arcuately inwardly directed surfaces 63 interconnecting the radial projections. The radial projections, as illustrated in FIG. 6, are cut away, except at the top and bottom of the fixturing device 40 to leave the projections 48. Also, left are the arcuate portions 54 along the central region 44 which previously were part of the arcuate surfaces 63. Chamfers 50 are cut on the projections 62 so that there are no sharp edges to catch on the cells when the devices are inserted and so that the projections do not contact the arms 16 and 18 of the unit cells where the welds are made. Next, vertical slots, as illustrated in FIG. 7, are cut on the opposite ends of the sleeve to form the leaf springs 46. Where a metal material is used as the starting material, the leaf springs 46 are bent inwardly to provide clearance between the projections and the inside of the unit cells. The device is then heat-treated to provide a high-yield strength and to maintain the leaf springs in the slightly inwardly bent configuration illustrated in FIG. 8.

In additional to the fixturing device 40, there is also provided a base 70 (FIGS. 9 and 10) having a plurality of holes 72 with axes corresponding to the axial positions of the unit cells in final assembly of the spacer. Further, a plurality of pins 74 are provided. Pins 74 have a diameter corresponding to the diameter of the openings 53 through the central regions 44 of the fixturing devices 40 and are receivable in the holes 72 of the base 70. The lower ends of the pins are tapered as at 76.

To align the unit cells in an assembly for welding the adjacent cells to one another, the unit cells are loosely arranged on top of the base 70 and the sleeves 42 are loosely inserted into the cells. The pins 74 are then partially inserted into the sleeves 42 such that the upper leaf springs 46 expand and engage the sides of the unit cells. The cells, sleeves and pins are then disposed horizontally close together so that they are approximately centered over the holes 72 in the base plate 70. This can be done with a set of four bars which form a square slightly larger than the final outer dimension of the spacer. With each unit cell approximately centered over a corresponding opening 72 in base 70, the pins 74 are fully inserted through the fixturing devices and into the base plate, as illustrated in FIGS. 9 and 10. It will be appreciated that the pins 74 expand the leaf springs of the fixturing devices to the interior dimensions of the unit cells, such that the projections 48 engage the linear extending interior sides of the octagonally shaped upper and lower arms 16 and 18, respectively. Once the pins 74 are driven into the holes 72, it will be further appreciated that the pins center the fixturing devices 40 and, in turn, center each unit cell with respect to the hole 72. Orientation of adjacent cells about the axes A—A of the cells occurs as a result of aligning the linear sides of the adjacent cells relative to one another. Thus, the unit cells are accurately aligned relative to one another in a final position and in a manner to enable welding of adjacent unit cells to one another.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A fixturing device for aligning unit cells relative to one another to form a nuclear fuel rod bundle spacer comprising:

an elongated one-piece sleeve having an elongated axis, a central region about said axis and a plurality of leaf springs projecting in opposite directions from said central region and spaced laterally from one another about said axis, each said leaf spring having a distal end including a laterally outwardly extending projection for engagement with the unit cell, the central region having an outer surface generally cruciform in shape.

2. A fixturing device according to claim 1 wherein said leaf springs extend from said central region inwardly toward said axis.

3. A fixturing device according to claim 1 wherein said central region has a circular opening having an axis coincident with the axis of said sleeve.

4. A fixturing device according to claim 1 wherein said projections are chamfered along their axially outer surfaces.

5. A fixturing device according to claim 1 wherein said sleeve is formed of metal and said leaf springs are symmetrically arranged about said axis.

6. A fixturing device according to claim 1 wherein said sleeve is formed of a plastic material and said leaf springs are symmetrically arranged about said axis.

7. A fixturing device according to claim 1 wherein said leaf springs extend from said central region inwardly toward said axis, said central region having a circular opening having an axis coincident with the axis of said sleeve, said projections being chamfered along their axially outer surfaces.

8. A fixturing device according to claim 7 wherein said sleeve is formed of metal and said leaf springs are symmetrically arranged about said axis.

9. A fixturing device according to claim 7 wherein said sleeve is formed of a plastic material and said leaf springs are symmetrically arranged about said axis.

10. A method of aligning unit cells for securement to one another to form a nuclear fuel rod bundle spacer comprising the steps of:

providing a plurality of unit cells;

providing a base having an array of holes on centers corresponding in location to the centers of the unit cells in their final assembly in the spacer;

disposing a fixturing device comprised of a sleeve having an axis and a plurality of springs about said axis in each unit cell;

inserting a pin through each fixturing device in a generally axial direction to displace the springs into engagement with the unit cell; and engaging each pin in a hole in said base to align the unit cells relative to one another.

11. A method according to claim 10 including welding the unit cells to one another while aligned.

12. A method according to claim 11 including, after welding, withdrawing the fixturing devices from within the unit cells.

13. A method according to claim 10 wherein said fixturing devices including said springs, in an unstressed condition of said springs, are of lesser lateral dimension than an interior dimension of said unit cells and including the step of freely disposing each fixturing device in a unit cell with the springs in the unstressed condition spaced from said unit cells.

14. A method according to claim 13 wherein said springs comprise leaf springs, and including the step of displacing said leaf springs of each fixturing device laterally outwardly into engagement with the unit cell in response to insertion of said pin into the fixturing device.

15. A method according to claim 10 wherein said springs comprise leaf springs projecting in opposite axial directions and, in an unstressed condition, having lateral dimensions less than the interior dimensions of said unit cells, including the steps of freely disposing each fixturing device in a unit cell with the springs in the unstressed condition spaced from the unit cells, and displacing said springs of each fixturing device laterally outwardly into engagement with the unit cell in response to insertion of said pin into the fixturing device, causing said springs to engage the unit cells at their opposite ends.

16. A fixture for aligning discrete unit cells relative to one another to form a nuclear fuel rod bundle spacer, each unit cell having an axis, comprising:

an elongated one-piece sleeve having a central opening and an elongated axis through said opening, a central region about said axis and a plurality of leaf springs projecting in opposite directions from said central region and spaced laterally from one another about said axis, said leaf springs extending from said central region inwardly toward said axis, each said leaf spring having a distal end including a laterally outwardly extending projection for engagement with the unit cell;

a base having a plurality of holes with central axes corresponding to the axes of the unit cells in final assembly of the spacer; and a plurality of pins for reception in the openings of said sleeves and having ends for reception in the holes of the base, said pins having a diameter for displacing said distal ends of said springs at opposite ends of said sleeve laterally outwardly away from said axis upon reception within said sleeve openings into engagement with the unit cells, whereby, upon placing the unit cells on said base and inserting said sleeves in the cells and the pins through the sleeves into the base holes, the unit cells are aligned relative to one another for forming the spacer.

17. A fixture according to claim 16 wherein said central region has an outer surface generally cruciform in shape and a circular opening having an axis coincident with the axis of said sleeve.

18. A fixture according to claim 16 wherein said projections are chamfered along their axially outer surfaces.

19. A fixture according to claim 16 wherein said sleeve is formed of metal and said leaf springs are symmetrically arranged about said axis, said projections being chamfered along their outer surface.

20. A fixture according to claim 16 wherein said sleeve is formed of a plastic material and said leaf springs are symmetrically arranged about said axis, said properties being chamfered along their outer surface.

* * * * *